United States Patent
Goyheneix et al.

(10) Patent No.: US 12,441,668 B2
(45) Date of Patent: Oct. 14, 2025

(54) METHOD OF PROCESSING WASTE PLASTIC AND PYROLYSIS OIL FROM WASTE PLASTIC

(71) Applicant: SABIC GLOBAL TECHNOLOGIES B.V., Bergen Op Zoom (NL)

(72) Inventors: Nicolas Goyheneix, Geleen (NL); Raul Velasco Pelaez, Sugar Land, TX (US); Robert Schucker, Sugar Land, TX (US); Ravichander Narayanaswamy, Bangalore (IN); Navin Asthana, Sugar Land, TX (US); Alexander Stanislaus, Bangalore (IN)

(73) Assignee: SABIC Global Technologies B.V., Bergen op Zoom (NL)

( * ) Notice: Subject to any disclaimer, the term of this patent is extended or adjusted under 35 U.S.C. 154(b) by 84 days.

(21) Appl. No.: 18/259,526

(22) PCT Filed: Nov. 24, 2021

(86) PCT No.: PCT/IB2021/060940
§ 371 (c)(1),
(2) Date: Jun. 27, 2023

(87) PCT Pub. No.: WO2022/144627
PCT Pub. Date: Jul. 7, 2022

(65) Prior Publication Data
US 2024/0059629 A1     Feb. 22, 2024

Related U.S. Application Data

(60) Provisional application No. 63/131,284, filed on Dec. 28, 2020.

(51) Int. Cl.
*C07C 4/06*     (2006.01)
*C07C 2/42*     (2006.01)
(Continued)

(52) U.S. Cl.
CPC ................ *C07C 4/06* (2013.01); *C07C 2/42* (2013.01); *C07C 4/04* (2013.01); *C07C 5/327* (2013.01)

(58) Field of Classification Search
CPC .... C07C 2/42; C07C 4/04; C07C 4/06; C07C 5/327; C10G 1/002; C10G 1/10; C10L 3/06
See application file for complete search history.

(56) References Cited

U.S. PATENT DOCUMENTS

| | | | | |
|---|---|---|---|---|
| 4,941,966 A | * | 7/1990 | Merz | C10G 1/083 208/112 |
| 6,096,937 A | * | 8/2000 | Butler | C07C 5/333 585/440 |

(Continued)

FOREIGN PATENT DOCUMENTS

| | | |
|---|---|---|
| CN | 109563413 A | 4/2019 |
| EP | 710270 B1 | 5/1996 |

(Continued)

OTHER PUBLICATIONS

Guan, et al. "Coking method for producing fuel oil for waste plastic", *Farming Zhuanii Shenqing*, 2015.

(Continued)

*Primary Examiner* — Sharon Pregler
(74) *Attorney, Agent, or Firm* — Norton Rose Fulbright US LLP

(57) ABSTRACT

Systems and methods for processing plastic derived pyrolysis oil are disclosed. A plastic derived pyrolysis oil and/or plastic are processed in a catalytic cracking unit and/or a thermal cracking unit under reaction conditions sufficient to produce a gaseous stream comprising propylene and a liquid stream. The liquid stream is further processed to produce additional propylene.

19 Claims, 8 Drawing Sheets

(51) Int. Cl.
*C07C 4/04* (2006.01)
*C07C 5/327* (2006.01)

(56) References Cited

U.S. PATENT DOCUMENTS

| | | | |
|---|---|---|---|
| 10,442,997 B2* | 10/2019 | Narayanaswamy | ..... C10G 1/02 |
| 10,513,661 B2 | 12/2019 | Narayanasway et al. | |
| 10,851,309 B2* | 12/2020 | Ramamurthy | ......... C10G 69/06 |
| 2002/0179493 A1 | 12/2002 | Etter | |
| 2006/0020047 A1* | 1/2006 | Wilkerson | ............ C07C 409/08 |
| | | | 528/86 |
| 2013/0248419 A1 | 9/2013 | Abba et al. | |
| 2016/0264885 A1 | 9/2016 | Narayanaswamy et al. | |
| 2016/0355617 A1* | 12/2016 | Kanyuh | ................ C08F 110/06 |
| 2018/0002609 A1 | 1/2018 | Narayanaswamy et al. | |
| 2019/0299491 A1 | 10/2019 | Stanislaus et al. | |
| 2019/0367428 A1 | 12/2019 | Ramamurthy et al. | |
| 2020/0017772 A1 | 1/2020 | Ramamurthy et al. | |

FOREIGN PATENT DOCUMENTS

| | | |
|---|---|---|
| FR | 2357630 A1 | 2/1978 |
| WO | WO 2015/128043 | 9/2015 |
| WO | WO 2018/011642 | 1/2018 |

OTHER PUBLICATIONS

International Search Report and Written Opinion issued in corresponding International Application No. PCT/IB2021/060940, mailed Mar. 1, 2022.

Nchare et al. "Co-processing vacuum residue with waste plastics in a delayed coking process: kinetics and modeling", *China Petroleum Processing and Petrochemical Technology*, vol. 14, No. 3, 44-49, 2012.

Sadrameli, S. M. "Thermal/catalytic crackling of liquid hydrocarbons for the production of olefins: A state-of-the-art-review II: Catalytic cracking review", *Fuel*, vol. 173, pp. 285-297, 2016.

Third Party Observation issued in counterpart European Patent Application No. 21819970.1 mailed Oct. 10, 2024.

Zhang et al. "Delayed coking of waste polyethylene plastic and vacuum residue", *Shiyou Lianzhi Hu Huagong*, vol. 32, No. 2, pp. 60-62, 2001. (English Translation Provided).

Office Action issued in corresponding Chinese Patent Application No. 202180092529.9 dated Jun. 26, 2025.

* cited by examiner

METHOD OF PROCESSING WASTE PLASTIC AND PYROLYSIS OIL FROM WASTE PLASTIC

CROSS REFERENCE TO RELATED APPLICATIONS

This application is a national phase under 35 U.S.C. § 371 of International Application PCT/IB2021/060940, filed Nov. 24, 2021, which claims the benefit of priority to U.S. Provisional Patent Application No. 63/131,284, filed Dec. 28, 2020, the entire contents of each of which are hereby incorporated by reference in their entirety.

FIELD OF INVENTION

The present invention generally relates to systems and methods for producing light olefins and polymers. More specifically, the present invention relates to systems and methods for producing light olefins and circular polymers using plastic as a feedstock.

BACKGROUND OF THE INVENTION

Every year, millions of tons plastic waste is generated. Waste plastics can pose serious environmental issues if they are not properly recycled or recovered. Over the last few decades, many processes have been explored to re-use plastics.

Conventionally, plastic waste is pyrolyzed to produce pyrolysis oil, which is a mixture of hydrocarbons that are primarily used as a fuel. However, the market value for pyrolysis oil as fuel is relatively low, thereby limiting the economic viability for pyrolyzing plastic waste. Furthermore, the produced pyrolysis oil often still contains heteroatoms contaminants, including chlorine, that can cause environmental pollution when directly burnt as fuel.

Overall, while the processes of re-using plastic waste exist, the need for improvements in this field persists in light of the aforementioned drawbacks with conventional processes.

BRIEF SUMMARY OF THE INVENTION

A solution to at least some of the above-mentioned problem associated with the processes of re-using plastic waste has been discovered. The solution resides in systems and methods of processing a pyrolysis oil derived from plastics for producing light olefins and aromatics. This can be beneficial to increase the value of plastic derived pyrolysis oil. Additionally, the disclosed method can include a hydrotreating step that is configured to remove heteroatoms from the pyrolysis oil, thereby mitigating the negative environmental impact of heteroatoms from the pyrolysis oil. Furthermore, the produced light olefins can be further processed to produce circular polyolefins, the produced benzene and at least some propylene can be used to produce cumene, phenol, acetone, Bisphenol-A (BPA), and the produced benzene and at least some ethylene can be used to produce styrene, thereby further increasing the value of plastic derived pyrolysis oil as a feedstock for producing high value chemicals. Therefore, the disclosed systems and methods of the present invention provide a technical solution to the problem associated with the conventional systems and methods for processing plastic derived pyrolysis oil.

Embodiments of the invention include a method of processing a pyrolysis oil. The method comprises processing, in a catalytic cracking unit and/or a thermal cracking unit, a pyrolysis oil obtained from pyrolysis of a plastic under reaction conditions sufficient to produce a gaseous stream comprising propylene and a liquid stream with a boiling range of 35 to 400° C. The method comprises processing the liquid stream to produce additional propylene.

Embodiments of the invention include a method of processing a plastic. The method comprises pyrolyzing a plastic under reaction conditions sufficient to produce a pyrolysis oil. The method includes processing at least a portion of the pyrolysis oil in a catalytic cracking unit and/or a thermal cracking unit under reaction conditions sufficient to produce a gaseous stream comprising propylene and a naphtha stream having a boiling range of 35 to 400° C. The method includes hydrotreating the naphtha stream to produce a hydrotreated naphtha stream. The method includes steam cracking the hydrotreated naphtha stream in a steam cracker to produce additional propylene.

Embodiments of the invention include a method of processing a plastic. The method includes thermal-cracking a plastic under reaction conditions sufficient to produce a gaseous stream comprising propylene and a liquid stream having a boiling range of 35 to 400° C. The method includes processing the liquid stream to produce additional propylene. The following includes definitions of various terms and phrases used throughout this specification.

The terms "about" or "approximately" are defined as being close to as understood by one of ordinary skill in the art. In one non-limiting embodiment the terms are defined to be within 10%, preferably, within 5%, more preferably, within 1%, and most preferably, within 0.5%.

The terms "wt. %", "vol. %" or "mol. %" refer to a weight, volume, or molar percentage of a component, respectively, based on the total weight, the total volume, or the total moles of material that includes the component. In a non-limiting example, 10 moles of component in 100 moles of the material is 10 mol. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification, include any measurable decrease or complete inhibition to achieve a desired result.

The term "effective," as that term is used in the specification and/or claims, means adequate to accomplish a desired, expected, or intended result.

The terms "circular polymer," and/or "circular polyolefin" as these terms are used in the specification and/or claims, means are materials that are produced using entirely or partly recycled plastics The use of the words "a" or "an" when used in conjunction with the term "comprising," "including," "containing," or "having" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The process of the present invention can "comprise," "consist essentially of," or "consist of" particular ingredients, components, compositions, etc., disclosed throughout the specification.

The term "primarily," as that term is used in the specification and/or claims, means greater than any of 50 wt. %, 50 mol. %, and 50 vol. %. For example, "primarily" may include 50.1 wt. % to 100 wt. % and all values and ranges there between, 50.1 mol. % to 100 mol. % and all values and ranges there between, or 50.1 vol. % to 100 vol. % and all values and ranges there between.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

For a more complete understanding, reference is now made to the following descriptions taken in conjunction with the accompanying drawings, in which.

DETAILED DESCRIPTION OF THE INVENTION

Currently, plastic waste processed via pyrolysis to produce a plastic derived pyrolysis oil is used and sold as a low valued fuel, resulting in low re-use value for the plastic waste. Additionally, plastic derived pyrolysis oil contains heteroatoms that can have negative environmental impact when pyrolysis oil is directly burnt as fuel. The present invention provides a solution to at least some of these problems. The solution is premised on a method of processing a plastic derived pyrolysis oil comprising producing light olefins and aromatics via catalytic cracking, thermal cracking and/or steam cracking, resulting in higher value for plastic derived pyrolysis oil. Furthermore, the method can include hydrotreating one or more process streams to remove heteroatoms, thereby mitigating the negative environmental impact of the pyrolysis oil. These and other non-limiting aspects of the present invention are discussed in further detail in the following sections.

A. System for Processing Plastics

Figure 1A:
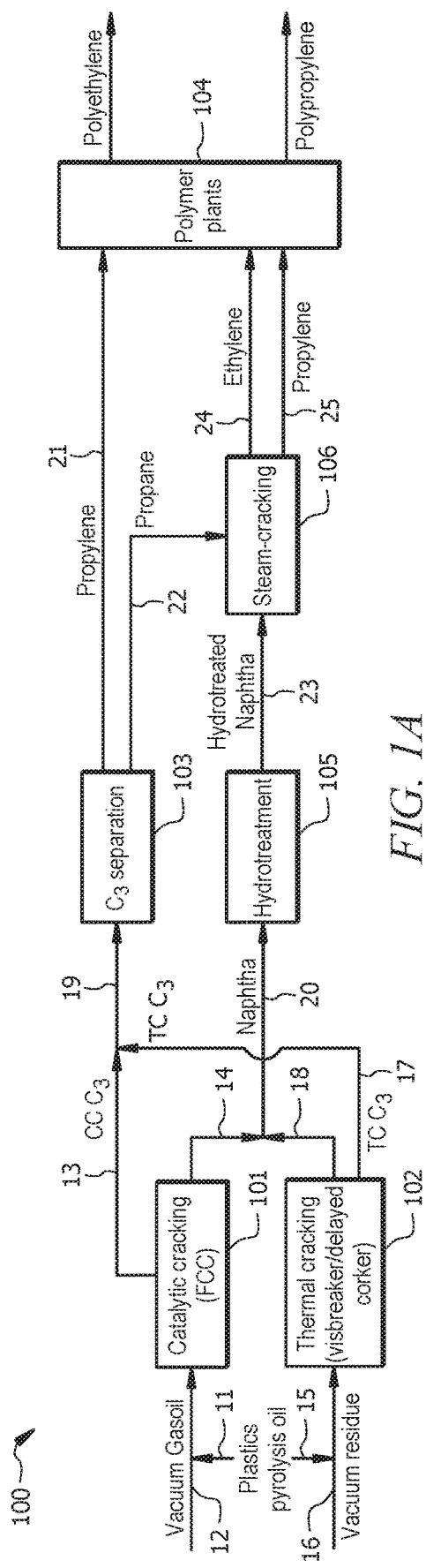
FIGS. 1A to 1E show schematic diagrams of systems for processing pyrolysis oil for producing light olefins and/or polymers, according to embodiments of the invention.

In embodiments of the invention, the system for processing plastics to produce high valued chemicals including light olefins, aromatics, and/or polymers can comprise a catalytic cracking unit, a hydrocracking unit, a thermal cracking unit, a steam cracking unit, and polymer plants. With reference to FIG. 1A, a schematic diagram is shown for system 100, which is used for processing pyrolysis oil.

According to embodiments of the invention, system 100 comprises catalytic cracking unit 101 configured to crack pyrolysis oil of first pyrolysis oil stream 11 and/or vacuum gasoil stream 12 to produce (1) catalytic cracking light stream 13 comprising $C_3$ hydrocarbons, and (2) first liquid stream 14 comprising naphtha. In embodiments of the invention, catalytic cracking unit 101 includes a fluid catalytic cracker and/or a hydrocracker. Catalytic cracking unit 101 can include a catalyst comprising alumina, aluminosilicates, zeolites, an X-type zeolite, a Y-type zeolite, a USY-zeolite, mordenite, faujasite, nano-crystalline zeolites, MCM mesoporous materials, SBA-15, a silico-alumino phosphate, a gallium phosphate, a titanophosphate or molecular sieve, metal loaded aluminosilicate, or combinations thereof. The pyrolysis oil can be produced by pyrolyzing plastics.

According to embodiments of the invention, system 100 comprises catalytic cracking unit 101 configured to crack pyrolysis oil of first pyrolysis oil stream 11 and/or vacuum gasoil stream 12 to produce: (1) catalytic cracking light stream 13 comprising $C_3$ hydrocarbons; and (2) first liquid stream 14 comprising naphtha. In embodiments of the invention, catalytic cracking unit 101 includes a hydrocracker. The hydrocracker can include a catalyst comprising noble or transition metals supported on alumina, silica, alumino-silicates, zeolites, or combinations thereof. The pyrolysis oil can be produced by pyrolyzing plastics.

According to embodiments of the invention, system 100 comprises thermal cracking unit 102 configured to crack pyrolysis oil of second pyrolysis oil stream 15 and/or vacuum residue stream 16 to produce (1) thermal cracking light stream 17 comprising $C_3$ hydrocarbons, and (2) second liquid stream 18 comprising naphtha. In embodiments of the invention, thermal cracking unit 102 includes a visbreaker, and/or a delayed coker. In embodiments of the invention, catalytic cracking light stream 13 is combined with thermal cracking light stream 17 to form combined light stream 19. First liquid stream 14 and second liquid stream 18 can be combined to form combined liquid stream 20.

According to embodiments of the invention, combined light stream 19 is flowed into separation unit 103. In embodiments of the invention, separation unit 103 is configured to separate combined light stream 19 to produce propylene stream 21 comprising primarily propylene and propane stream 22 comprising primarily propane. In embodiments of the invention, separation unit 103 comprises one or more distillation columns.

According to embodiments of the invention, an outlet of separation unit 103 is in fluid communication with an inlet of polymer plant 104 such that propylene stream 21 flows from separation unit 103 to polymer plant 104. Polymer plant 104 can be configured to react propylene to produce polypropylene. In embodiments of the invention, polymer plant 104 may use any of the following production processes: solution polymerization, slurry polymerization, gas phase polymerization, bulk polymerization, or combinations thereof.

According to embodiments of the invention, combined liquid stream 20 is flowed into hydrotreatment unit 105. Hydrotreatment unit 105 is configured to hydrotreat combined liquid stream 20 to produce hydrotreated liquid stream 23. In embodiments of the invention, an outlet of separation unit 103 is in fluid communication with an inlet of steam cracking unit 106 such that propane stream 22 flows from separation unit 103 to steam cracking unit 106. An outlet of hydrotreatment unit 105 may be in fluid communication with an inlet of steam cracking unit 106 such that hydrogenated liquid stream 23 flows from hydrotreatment unit 105 to steam cracking unit 106. In embodiments of the invention, steam cracking unit 106 is configured to steam-crack propane of propane stream 22 and naphtha of hydrotreated liquid stream 23 to produce ethylene stream 24 comprising primarily ethylene and second propylene stream 25 comprising primarily propylene. In embodiments of the invention, an outlet of steam cracking unit 106 is in fluid communication with polymer plant 104 such that ethylene stream 24 flows from steam cracking unit 106 to polymer plant 104. An outlet of steam cracking unit 106 is in fluid communication with polymer plant 104 such that second propylene stream 25 flows to polymer plant 104. Polymer plant 104 may be further configured to react ethylene to produce polyethylene. In embodiments of the invention, catalytic cracking unit 101, thermal cracking unit 102, and steam cracking unit 106 may each individually comprise a separation unit for separating an effluent therefrom.

Figure 1B:
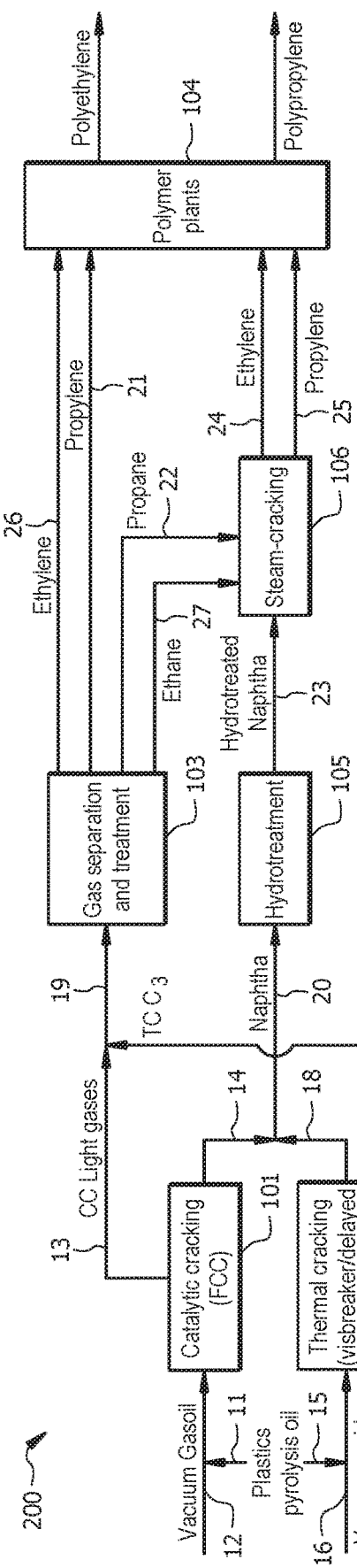

According to embodiments of the invention, as shown in FIG. 1B, system 200 includes all the units and streams as system 100 except as shown in FIG. 1B and described below. In embodiments of the invention, in system 200, thermal cracking light stream 17, catalytic cracking light stream 13, and combined light stream 19 comprise both $C_2$ (ethane and ethylene) hydrocarbons and $C_3$ hydrocarbons. In embodiments of the invention, separation unit 103 of system 200 is configured to separate combined light stream 19 to produce propylene stream 21, propane stream 22, second ethylene stream 26 comprising primarily ethylene, ethane stream 27 comprising primarily ethane. In embodiments of the invention, in system 200, second ethylene stream 26 is flowed into polymer plant 104. Ethane stream 27 and propane stream 22 are flowed into steam cracking unit 106.

Figure 1C:
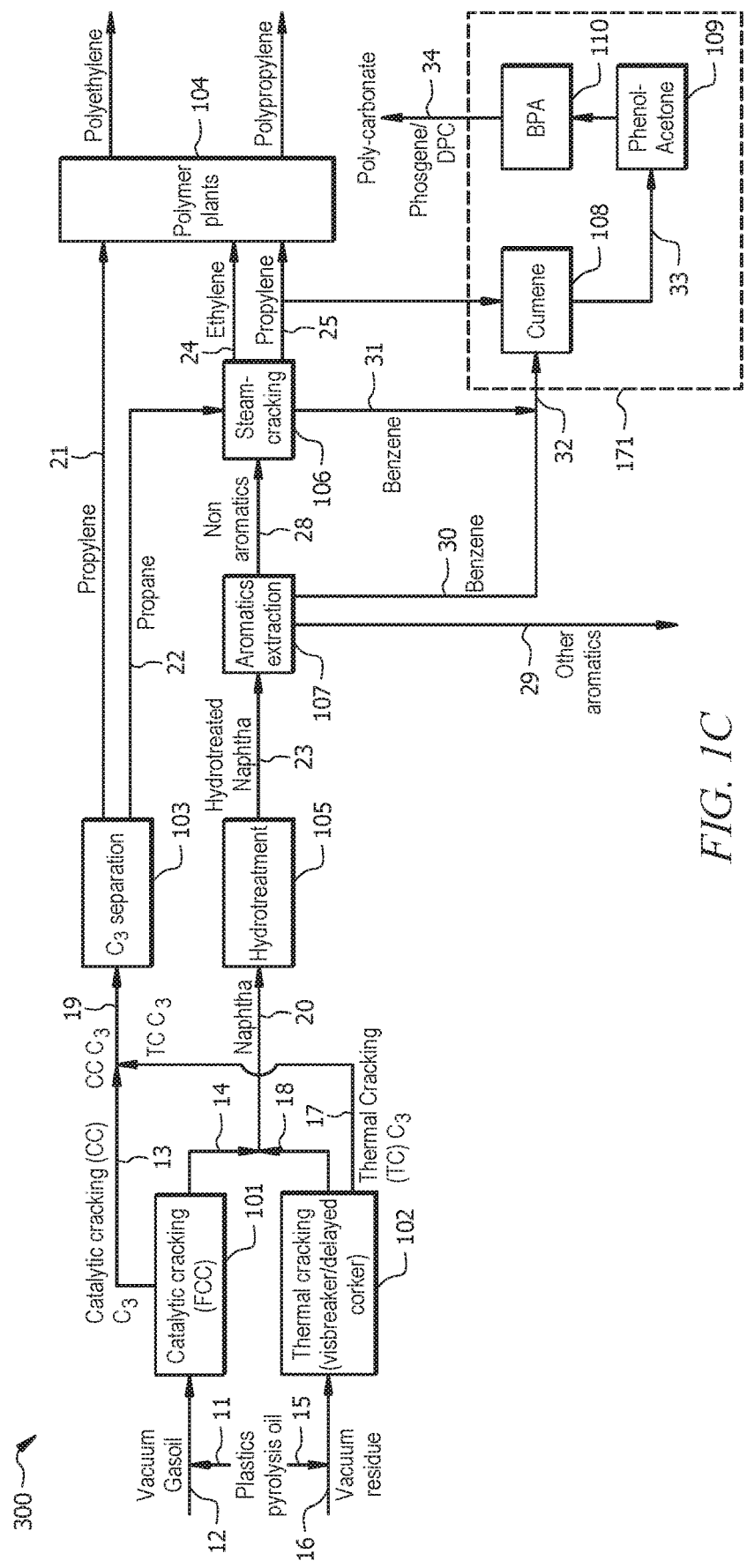

According to embodiments of the invention, as shown in FIG. 1C, system 300 includes all the units and streams as system 100 except as shown in FIG. 1C and described below. In embodiments of the invention, system 300 further includes aromatics extraction unit 107 installed downstream to hydrotreatment unit 105 and upstream to steam cracking unit 106. In embodiments of the invention, in system 300, hydrogenated liquid stream 23 flows from hydrotreatment unit 105 to aromatics extraction unit 107. Aromatics extraction unit 107, in embodiments of the invention, can be configured to process hydrotreated liquid stream 23 to produce non-aromatic stream 28 comprising less than 20 wt. % aromatics, aromatics stream 29 comprising aromatics with substantially no benzene, benzene stream 30 comprising primarily benzene. In embodiments of the invention, in system 300, steam cracking unit 106 is configured to steam crack propane stream 22, and non-aromatics stream 28 (compared to system 100, which is configured to crack hydrotreated liquid stream 23) to produce ethylene stream 24, second propylene stream 25, and second benzene stream 31 comprising primarily benzene 31. In embodiments of the invention, in system 300, benzene stream 30 and second benzene stream 31 are combined to form combined benzene stream 32. According to embodiments of the invention, compared to system 100, system 300 further comprises BPA plant 171. BPA plant 171 may include cumene synthesis unit 108 configured to react benzene of combined benzene stream 32 with propylene of at least a portion of second propylene stream 25 to produce cumene stream 33 comprising primarily cumene. BPA (bis-phenol A) plant 171 can further comprise phenol and acetone unit 109 configured to react cumene of cumene stream 33 with oxygen to produce phenol and acetone. BPA plant 171 further includes BPA synthesis unit 110 configured to react acetone and phenol to produce BPA stream 34 comprising primarily BPA. In embodiments of the invention, BPA stream 34 can be used to produce polycarbonate.

Figure 1D:
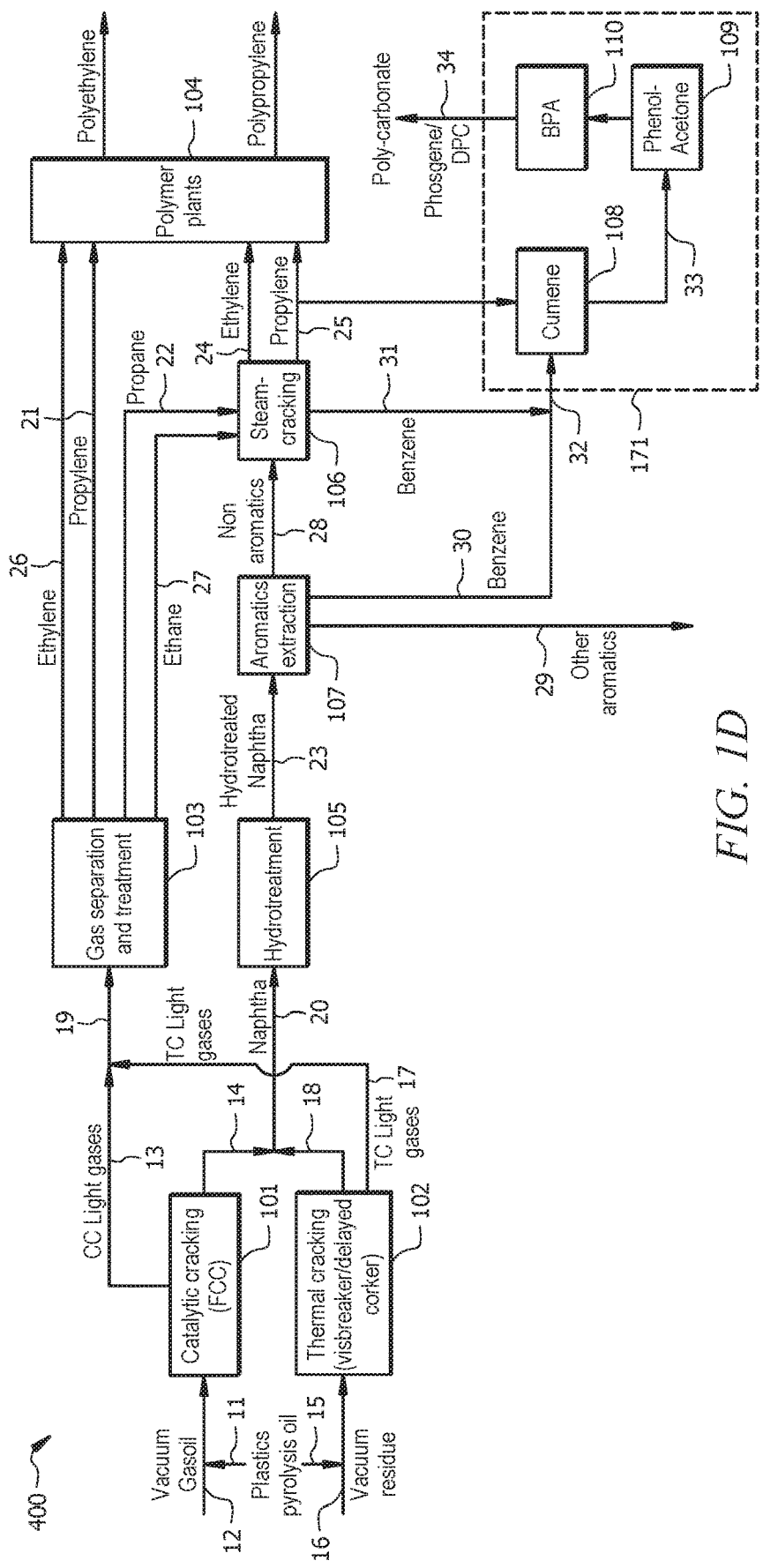

According to embodiments of the invention, as shown in FIG. 1D, system 400 includes all the units and streams as system 300 except as shown in FIG. 1D and described below. In embodiments of the invention, in system 400, catalytic cracking light stream 13, thermal cracking light stream 17, and/or combined light stream 19 comprises both $C_2$ hydrocarbons and $C_3$ hydrocarbons. In embodiments of the invention, in system 400, separation unit 103 includes a gas separation and treatment unit configured to separate combined light stream 19 to produce propylene stream 21, propane stream 22, second ethylene stream 26 comprising primarily ethylene, ethane stream 27 comprising primarily ethane. In embodiments of the invention, in system 400, second ethylene stream 26 is flowed into polymer plant 104. Ethane stream 27 can be flowed into steam cracking unit 106.

Figure 1E:
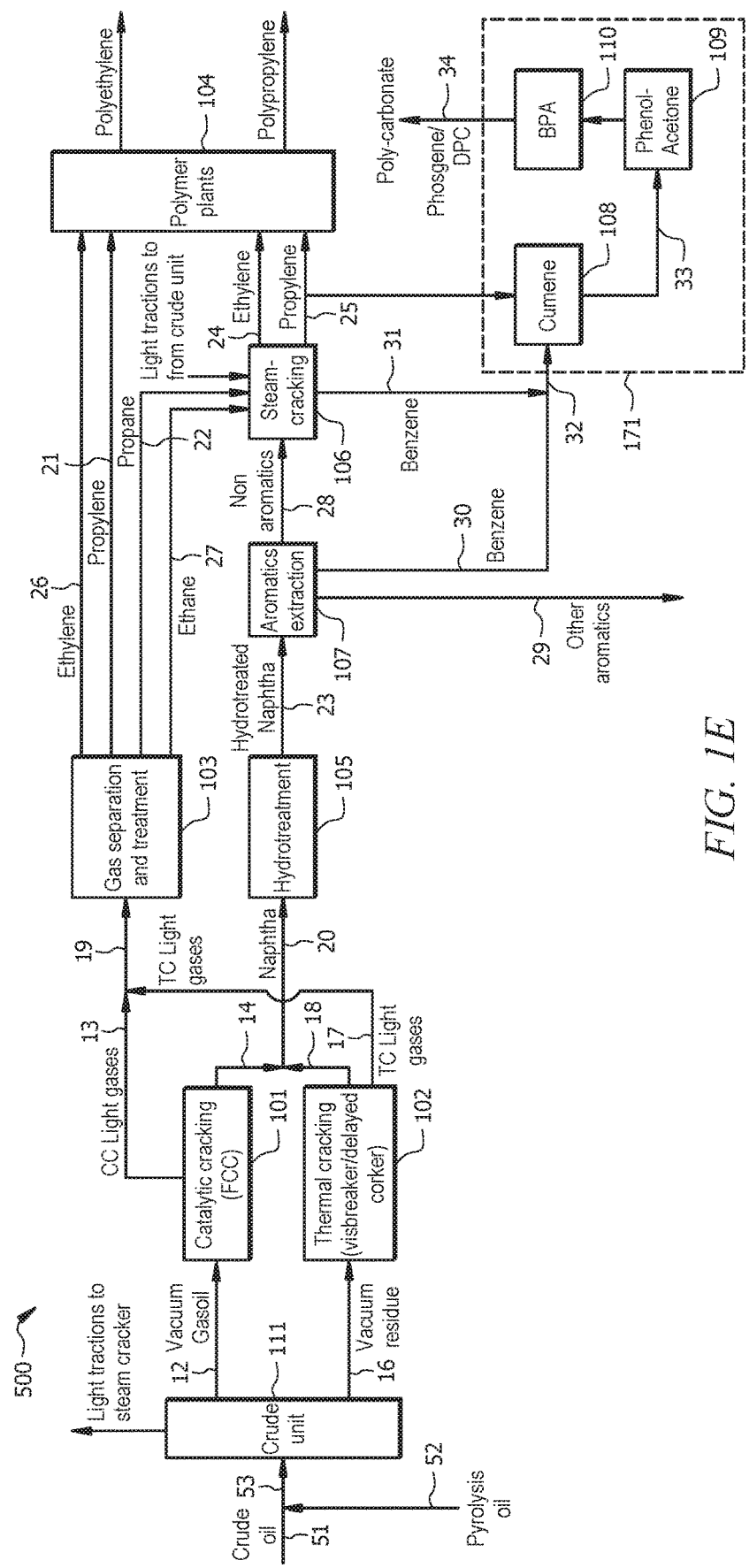

According to embodiments of the invention, as shown in FIG. 1E, system 500 includes all the units and streams as system 400 except as shown in FIG. 1E and described below. In embodiments of the invention, in system 500, plastic derived pyrolysis oil stream 52 is first mixed with crude oil of crude oil stream 51 to form feedstock mixture 53. System 500 further comprises crude distillation unit 111 configured to distill feedstock mixture 53 to produce vacuum gas oil stream 12 and vacuum residue stream 16. In embodiments of the invention, in system 500, vacuum gasoil stream 12 is processed in catalytic cracking unit 101. Vacuum residue stream 16 can be processed in thermal cracking unit 102 and the light fraction which is processed in the steam cracker.

Figure 1F:
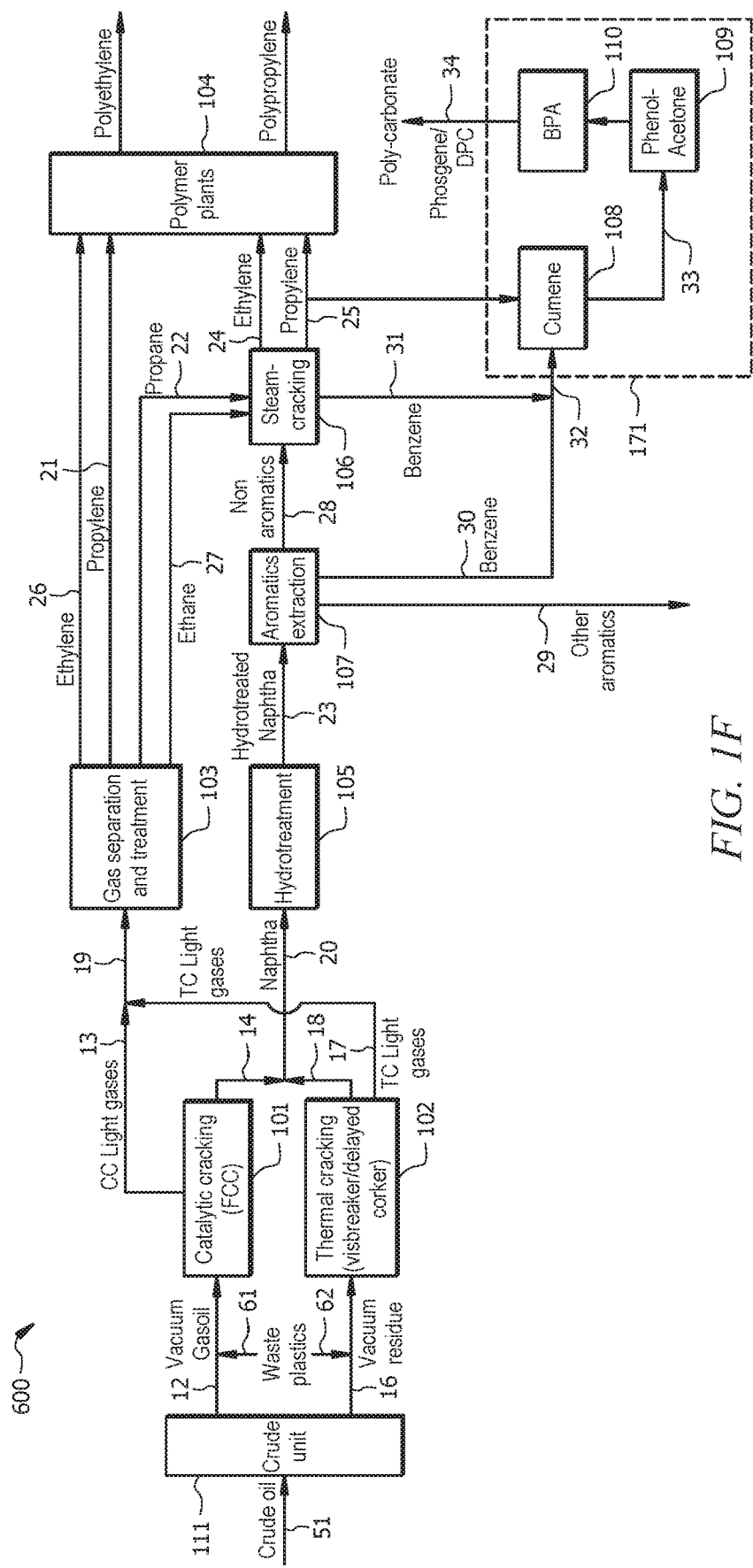
FIGS. 1F and 1H show schematic diagrams of systems for processing plastics for producing light olefins and/or polymers, according to embodiments of the invention.

According to embodiments of the invention, as shown in FIG. 1F, system 600 includes all the units and stream as system 500 except as shown in FIG. 1F and described below. In embodiments of the invention, system 600 does not include pyrolysis oil stream 52 mixed with crude oil stream 51. In embodiments of the invention, in system 600, first plastic stream 61 comprising primarily plastics is mixed with vacuum gasoil stream 12, and second plastic stream 62 comprising primarily plastics is mixed with vacuum residue stream 16. Catalytic cracking unit 101 of system 600 can be configured to crack first plastic stream 61 and vacuum gasoil stream 12 to produce first liquid stream 14 comprising primarily naphtha, and catalytic cracking light stream 13 comprising $C_2$ and/or $C_3$ hydrocarbons. Thermal cracking unit 102 of system 600 can be configured to crack second plastic stream 62 and vacuum gasoil stream 16 to produce second liquid stream 18 comprising primarily naphtha, and thermal cracking light stream 17 comprising $C_2$ and/or $C_3$ hydrocarbons.

Figure 1G:
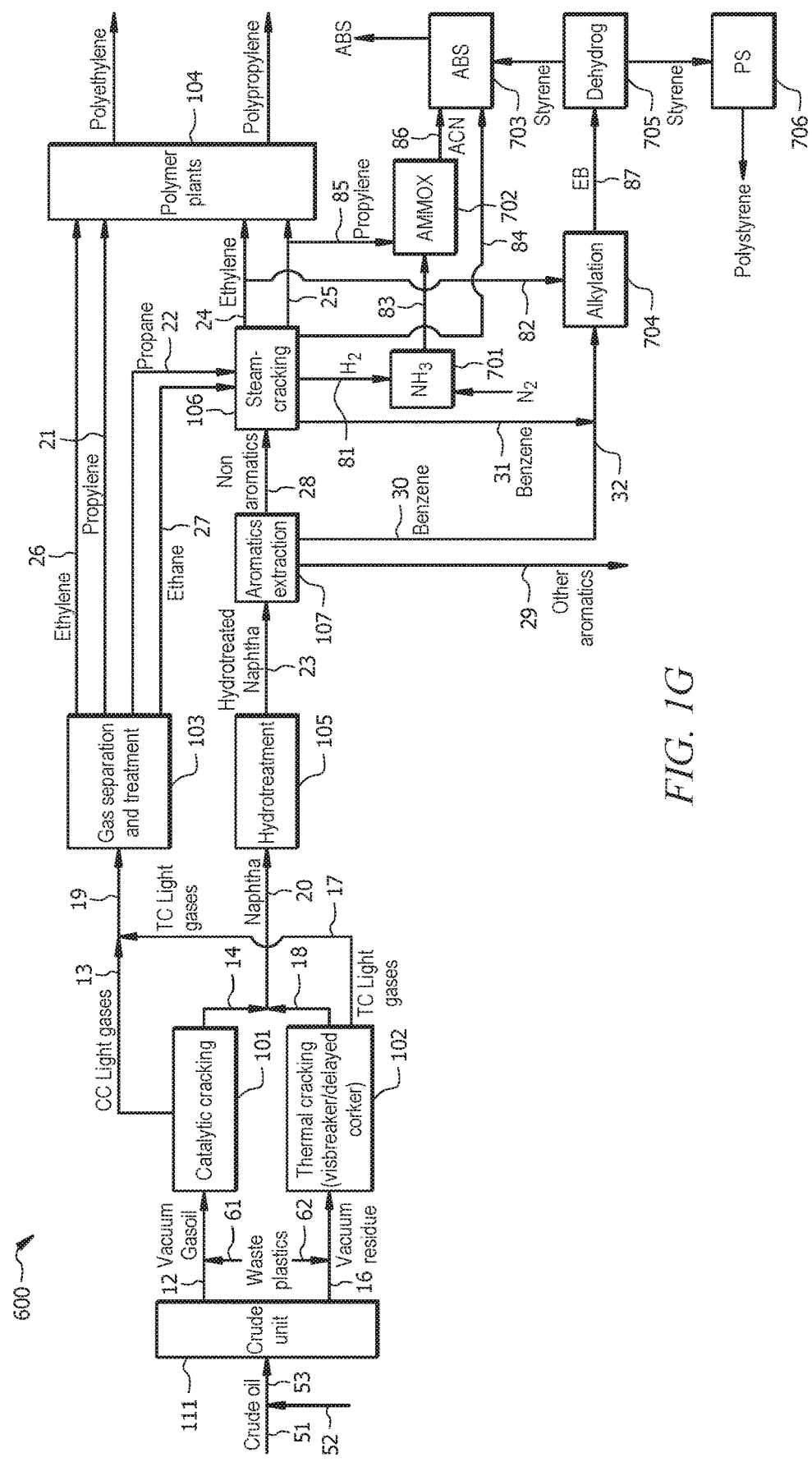

According to embodiments of the invention, as shown in FIG. 1G, system 1000 includes all the units and streams as system 600 except as shown in FIG. 1G and described below. Compared to system 600, in system 1000, in embodiments of the invention, pyrolysis oil stream 52 is mixed with crude oil stream 51 to form mixture stream 53. Mixture stream 53 can be fed into crude distillation unit 111. In embodiments of the invention, in system 1000, steam-cracking unit 106 is further configured to produce hydrogen stream 81 comprising primarily hydrogen and butadiene stream 84 comprising primarily butadiene. Hydrogen of hydrogen stream 81 can be used to react with nitrogen gas in $NH_3$ synthesis unit 701 to produce $NH_3$ stream 83 comprising primarily NH$_3$. At least a portion of second propylene stream 25 and NH$_3$ stream 83 may be used to produce acrylonitrile stream 86 comprising primarily acrylonitrile (ACN) in ammoxidation unit 702. Butadiene stream 84 and acrylonitrile stream 86 can be used to produce acrylonitrile butadiene styrene (ABS) in ABS synthesis unit 703. In embodiments of the invention, at least a portion of ethylene stream 24 and combined benzene stream 32 can be used to produce, in alkylation unit 704, ethylbenzene stream 87 comprising primarily ethylbenzene. In embodiments of the invention, ethybenzene of ethylbenzene stream 87 is dehydrogenated in dehydrogenation unit 705 to produce styrene. In embodiments of the invention, butadiene stream 84, acrylonitrile stream 86, and at least some styrene produced in dehydrogenation unit 705 can be used to produce acrylonitrile butadiene styrene (ABS) in ABS synthesis unit 703. In embodiments of the invention, at least some styrene produced in dehydrogenation unit 705 can be used to produce polystyrene in polystyrene synthesis unit 706. In embodiments of the invention, the styrene from dehydrogenation unit 705 can be used to produce acrylonitrile resin (SAN), or styrene-butadiene rubber (SBR).

Figure 1H:
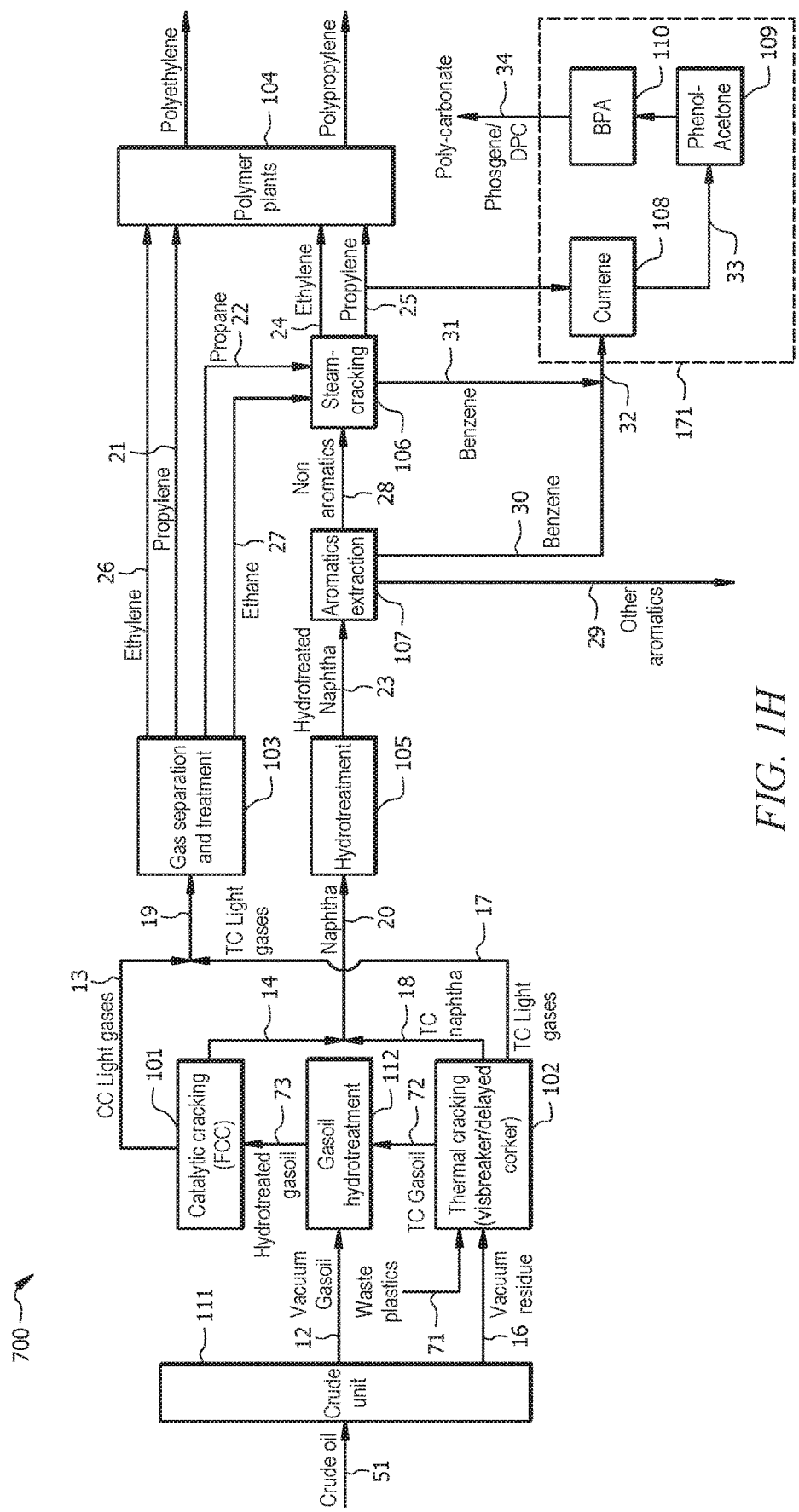

According to embodiments of the invention, as shown in FIG. 1H, system 700 includes all the units and streams as system 600 except as shown in FIG. 1H and described below. Compared to system 600, in system 700, no plastic is fed into catalytic cracking unit 101. In embodiments of the invention, in system 700, vacuum gasoil stream 12 is fed into gasoil hydrotreatment unit 112. In embodiments of the invention, in system 700, plastic stream 71 comprising primarily plastics and vacuum residue stream 16 can be fed into thermal cracking unit 102, which is configured to thermal-crack plastics and vacuum residue to produce second liquid stream 18, second light stream 17, and thermal cracking gasoil stream 72 comprising primarily gasoil. An outlet of thermal cracking unit 102 may be in fluid communication with an inlet of gasoil hydrotreatment unit 112 such that thermal crack gasoil stream 72 flows from thermal cracking unit 102 to gasoil hydrotreatment unit 112. Gasoil hydrotreatment unit 112 may be configured to hydrotreat vacuum gasoil of vacuum gasoil stream 12 and/or gasoil of thermal crack gasoil stream 72 to produce hydrotreated gasoil stream 73. In embodiments of the invention, in system 700, catalytic cracking unit 101 is configured to catalytic-crack hydrotreated gasoil of hydrotreated gasoil stream 73 to produce first liquid stream 14 comprising primarily naphtha, and catalytic cracking light stream 13 comprising C$_2$ and C$_3$ hydrocarbons.

B. Method for Processing Plastic and/or Plastic Derived Pyrolysis Oil

A method of processing plastic and/or plastic derived pyrolysis oil has been discovered. The method may be capable of increasing the value of waste plastics and/or plastic derived pyrolysis oil compared to conventional processes, which directly use plastic derived pyrolysis oil as fuel. Method 80 as shown in FIG. 2A may be implement by systems 100-600, as shown in FIGS. 1A-1F.

According to embodiments of the invention, as shown in block 801, method 80 comprises processing, in catalytic cracking unit 101, and/or thermal cracking unit 102, a pyrolysis oil obtained from pyrolysis of a plastic under reaction conditions sufficient to produce combined light stream 19 comprising propylene and combined liquid stream 20 comprising primarily naphtha. Naphtha of combined liquid stream 20 may have an initial boiling range of 0 to 60° C. and a final boiling range of 150 to 400° C. In embodiments of the invention, the plastic can include polyolefins, polyethylene terephthalate (PET), polyamide (PA) and polyvinyl chloride (PVC), polystyrene (PS), polycarbonate (PC), and acrylonitrile/butadiene/styrene co-polymer (ABS), or combinations thereof.

Figure 2A:
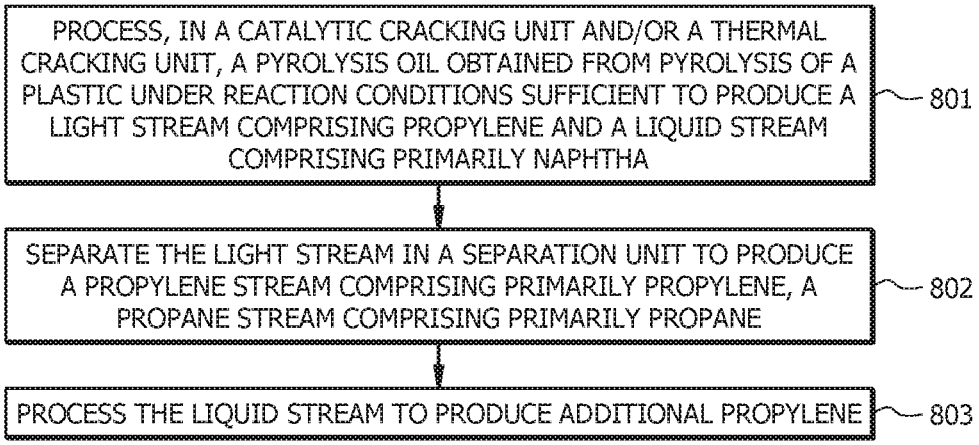
FIG. 2A shows a schematic flowchart of a method of processing pyrolysis oil for producing light olefins and/or polymers, according to embodiments of the invention.

As shown in FIGS. 1A, 1C, and 2A, the processing at block 801, in embodiments of the invention, can include flowing vacuum gasoil stream 12 and first pyrolysis oil stream 11 into catalytic cracking unit 101, and catalytic cracking pyrolysis oil of first pyrolysis oil stream 11 and vacuum gas oil of vacuum gas oil stream 12 in catalytic cracking unit 101 under reaction conditions sufficient to produce (1) catalytic cracking light stream 13 comprising C$_3$ hydrocarbons and (2) first liquid stream 14 comprising primarily naphtha. In embodiments of the invention, catalytic cracking unit 101 can include a fluid catalytic cracking unit or a hydrocracking unit. In embodiments of the invention, catalytic cracking unit 101 (the fluid catalytic cracking unit or the hydrocracking unit), at block 801, is operated at an operating temperature of 450 to 750° C. and an operating pressure of 1 to 6 bara. In embodiments of the invention, processing at block 801 can include thermal cracking pyrolysis oil of second pyrolysis oil stream 15 and/or vacuum residue of vacuum residue stream 16 in thermal cracking unit 102 under reaction conditions sufficient to produce (1) thermal cracking light stream 17 comprising C$_3$ hydrocarbons, and (2) second liquid stream 18 comprising primarily naphtha. In embodiments of the invention, thermal cracking unit 102, at block 801, is operated at an operating temperature of 350 to 900° C. and an operating pressure of 1 to 6 bara. Catalytic cracking light stream 13 and thermal cracking light stream 17 can be combined to form combined light stream 19. First liquid stream 14 and second liquid stream 18 can be combined to form combined liquid stream 20.

As shown in FIGS. 1B, 1D, and 2A, the processing at block 801, in embodiments of the invention, can include catalytic cracking pyrolysis oil of first pyrolysis oil stream 11 and vacuum gas oil of vacuum gas oil stream 12 in catalytic cracking unit 101 under reaction conditions sufficient to produce (1) catalytic cracking light stream 13 comprising C$_3$ hydrocarbons and C$_2$ hydrocarbons, and (2) first liquid stream 14 comprising primarily naphtha. In embodiments of the invention, catalytic cracking unit 101, at block 801, is operated at an operating temperature of 450 to 750° C. and an operating pressure of 1 to 6 bara. Processing at block 801 can include thermal cracking pyrolysis oil of second pyrolysis oil stream 15 and/or vacuum residue of vacuum residue stream 16 in thermal cracking unit 102 under reaction conditions sufficient to produce (1) thermal cracking light stream 17 comprising C$_3$ hydrocarbons and C$_2$ hydrocarbons, and (2) second liquid stream 18 comprising primarily naphtha. In embodiments of the invention, thermal cracking unit 102, at block 801, is operated at an operating temperature of 350 to 900° C. and an operating pressure of 1 to 6 bara. Catalytic cracking light stream 13 and thermal cracking light stream 17 can be combined to form combined light stream 19. First liquid stream 14 and second liquid stream 18 can be combined to form combined liquid stream 20.

As shown in FIG. 1E, the processing at block 801, in embodiments of the invention, can include mixing crude oil stream 51 with pyrolysis oil stream 52 to produce mixture stream 53, and distilling mixture stream 53 in crude unit 111 to form vacuum gasoil stream 12 and vacuum residue stream 16. In system 500 as shown in FIG. 1E, processing at block 801 further includes catalytic-cracking vacuum gas oil stream 12 in catalytic cracking unit 101 under reaction conditions sufficient to produce (1) catalytic cracking light stream 13 comprising $C_3$ hydrocarbons and $C_2$ hydrocarbons, and (2) first liquid stream 14 comprising primarily naphtha. In embodiments of the invention, catalytic cracking unit 101, at block 801, is operated at an operating temperature of 450 to 750° C. and an operating pressure of 1 to 6 bara. In system 500 as shown in FIG. 1E, processing at block 801 can include thermal cracking vacuum residue stream 16 in thermal cracking unit 102 under reaction conditions sufficient to produce (1) thermal cracking light stream 17 comprising $C_3$ hydrocarbons and $C_2$ hydrocarbons, and (2) second liquid stream 18 comprising primarily naphtha. In embodiments of the invention, thermal cracking unit 102, at block 801, is operated at an operating temperature of 350 to 900° C. and an operating pressure of 1 to 6 bara. Catalytic cracking light stream 13 and thermal cracking light stream 17 can be combined to form combined light stream 19. First liquid stream 14 and second liquid stream 18 can be combined to form combined liquid stream 20.

As shown in FIG. 1F, in embodiments of the invention, processing at block 801 can include mixing plastic of first waste plastic stream 61 with vacuum gasoil stream 12, and catalytic-cracking mixed vacuum gas oil stream 12 and first waste plastic stream 61 in catalytic cracking unit 101 under reaction conditions sufficient to produce (1) catalytic cracking light stream 13 comprising $C_3$ hydrocarbons and $C_2$ hydrocarbons, and (2) first liquid stream 14 comprising primarily naphtha. In embodiments of the invention, catalytic cracking unit 101, at block 801, is operated at an operating temperature of 450 to 750° C. and an operating pressure of 1 to 6 bara. In system 600 as shown in FIG. 1F, processing at block 801 can include mixing plastics of second waste plastic stream 62 with vacuum residue stream 16, and thermal cracking mixed pyrolysis oil of second waste plastic stream 62 and vacuum residue of vacuum residue stream 16 in thermal cracking unit 102 under reaction conditions sufficient to produce (1) thermal cracking light stream 17 comprising $C_3$ hydrocarbons and $C_2$ hydrocarbons, and (2) second liquid stream 18 comprising primarily naphtha. In embodiments of the invention, thermal cracking unit 102, at block 801, is operated at an operating temperature of 350 to 900° C. and an operating pressure of 1 to 6 bara. Catalytic cracking light stream 13 and thermal cracking light stream 17 can be combined to form combined light stream 19. First liquid stream 14 and second liquid stream 18 can be combined to form combined liquid stream 20.

According to embodiments of the invention, as shown in block 802, method 80 includes separating combined light stream 19 in separation unit 103 to produce propylene stream 21 comprising primarily propylene, propane stream 22 comprising primarily propane. As shown in FIGS. 1B and 1D-1F, separating at block 802 may further produce ethylene stream 26 comprising primarily ethylene and ethane stream 27 comprising primarily ethane. Separation unit 103 may include one or more distillation columns. Propylene of propylene stream 21 may be processed in polymer plant 104 to produce polypropylene. Ethylene of ethylene stream 26 may be processed in polymer plant 104 to produce polyethylene. Ethane stream 27 and/or propane stream 22 may be flowed into steam cracking unit 106 for producing additional ethylene and additional propylene, respectively.

According to embodiments of the invention, as shown in block 803, method 80 includes processing combined liquid stream 20 to produce additional propylene. In embodiments of the invention, as shown in FIGS. 1A-1G, processing at block 803 includes hydrotreating combined liquid stream 20 in hydrotreatment unit 105 to produce hydrotreated liquid stream 23 comprising primarily hydrotreated naphtha.

As shown in FIGS. 1A and 1B, in embodiments of the invention, processing at block 803 can include steam cracking hydrotreated liquid stream 23 to produce additional ethylene and additional propylene. In embodiments of the invention, steam cracking unit 106 is operated at an operating temperature of 750 to 900° C., a residence time of 50 ms to 1 s, and a steam to hydrocarbon ratio of 0.2 to 1. In embodiments of the invention, ethylene (second ethylene stream 24) from steam cracking unit 106 is processed in polymer plant 104 to produce polyethylene. Propylene (second propylene stream 25) from steam cracking unit 106 can be processed in polymer plant 104 to produce polypropylene.

As shown in FIGS. 1C-1G, in embodiments of the invention, the processing at block 803 can include processing hydrotreated liquid stream 23 in aromatics extraction unit 107 to produce benzene stream 30 comprising primarily benzene, aromatics stream 29 comprising non-benzene aromatics, and non-aromatics stream 28 comprising less than 20 wt. % aromatics. In embodiments of the invention, as shown in FIGS. 1C to 1F, non-aromatics stream 28 is steam-cracked in steam cracking unit 106 to produce the additional ethylene (second ethylene stream 24) and the additional propylene (second propylene stream 25). As shown in FIGS. 1C to 1F, steam cracking of non-aromatics stream 28 can further produce second benzene stream 31 comprising primarily benzene. In embodiments of the invention, ethylene from steam cracking unit 106 is processed in polymer plant 104 to produce polyethylene. Propylene from steam cracking unit 106 can be processed in polymer plant 104 to produce polypropylene. In embodiments of the invention, benzene stream 30 and second benzene stream 31 are combined to form combined benzene stream 32. As shown in FIGS. 1C-1F, at least a portion of propylene of second propylene stream 25 and combined benzene stream 32 are flowed into BPA plant 171. The at least a portion of propylene of second propylene stream 25 and benzene of combined benzene stream 32 can be processed in BPA plant 171 to produce BPA. In embodiments of the invention, the produced BPA of BPA plant 171 is further processed to produce polycarbonate stream 34 comprising primarily polycarbonate. As shown in FIG. 1G, steam-cracking unit 106 is further configured to produce hydrogen stream 81 comprising primarily hydrogen and butadiene stream 84 comprising primarily butadiene. Hydrogen of hydrogen stream 81 can be used to react with nitrogen gas in $NH_3$ synthesis unit 701 to produce $NH_3$ stream 83 comprising primarily $NH_3$. At least a portion of second propylene stream 25 and $NH_3$ stream 83 may be used to produce acrylonitrile stream 86 comprising primarily acrylonitrile (ACN) in ammoxidation unit 702. Butadiene stream 84 and acrylonitrile stream 86 can be used to produce acrylonitrile butadiene styrene (ABS) in ABS synthesis unit 703. In embodiments of the invention, at least a portion of ethylene stream 24 and combined benzene stream 32 can be used to produce, in alkylation unit 704, ethylbenzene stream 87 comprising primarily ethylbenzene. In embodiments of the invention, ethybenzene of ethylbenzene stream 87 is dehydrogenated in dehydrogenation unit 705 to produce styrene. In embodiments of the invention, butadiene stream 84, acrylonitrile stream 86, and at least some styrene produced in dehydrogenation unit 705 can be used to produce acrylonitrile butadiene styrene (ABS) in ABS synthesis unit 703. In embodiments of the invention, at least some styrene produced in dehydrogenation unit 705 can be used to produce polystyrene in polystyrene synthesis unit 706.

Figure 2B:
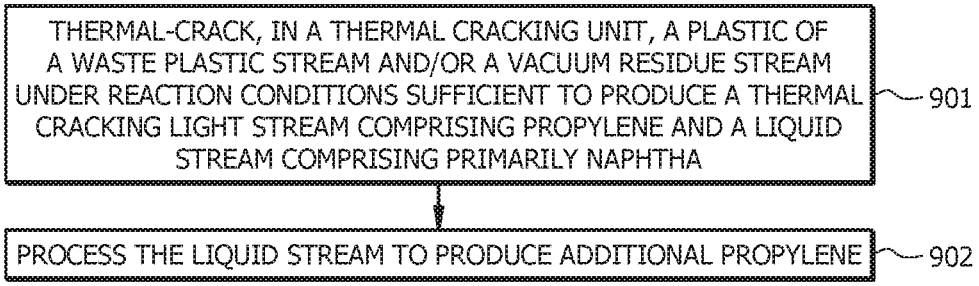
FIG. 2B shows a schematic flowchart of a method of processing plastics for producing light olefins and/or polymers, according to embodiments of the invention.

Embodiments of the invention includes method 90 for processing a plastic. Method 90 as shown in FIG. 2B can be implemented in system 700, as shown in FIG. 1H and discussed above. According to embodiments of the invention, as shown in block 901, method 90 includes thermal-cracking, in thermal cracking unit 101, a plastic of waste plastic stream 71 and/or vacuum residue stream 16 under reaction conditions sufficient to produce thermal cracking light stream 17 comprising propylene and second liquid stream 18 comprising naphtha. In embodiments of the invention, thermal cracking light stream 17 is a gaseous stream. Thermal cracking light stream 17 can further include ethane, ethylene, propane, or combinations thereof. Second liquid stream 18 may have an initial boiling range of 0 to 50° C. and a final boiling range of 150 to 400° C. In embodiments of the invention, vacuum gasoil stream 12 is processed in gasoil hydrotreatment unit 112 to produce hydrotreated gasoil stream 73. In embodiments of the invention, hydrotreated gasoil stream 73 is cracked in catalytic cracking unit 101 to produce catalytic cracking light stream 13 comprising (1) $C_2$ hydrocarbons including ethane and/or ethylene, and (2) $C_3$ hydrocarbons including propane and/or propylene.

According to embodiments of the invention, as shown in block 902, method 90 comprises processing second liquid stream 18 to produce additional propylene. In embodiments of the invention, processing at block 902 includes combining first liquid stream 14 with second liquid stream 18 to form combined liquid stream 20. In embodiments of the invention, combined liquid stream 20 is processed according to steps of block 803. In embodiments of the invention, catalytic cracking light stream 13 is combined with thermal cracking stream 17 to form combined light stream 19. In embodiments of the invention, combined light stream 19 is processed according to steps of block 802.

Although embodiments of the present invention have been described with reference to blocks of FIGS. 2A and 2B should be appreciated that operation of the present invention is not limited to the particular blocks and/or the particular order of the blocks illustrated in FIGS. 2A and 2B. Accordingly, embodiments of the invention may provide functionality as described herein using various blocks in a sequence different than that of FIGS. 2A and 2B.

The systems and processes described herein can also include various equipment that is not shown and is known to one of skill in the art of chemical processing. For example, some controllers, piping, computers, valves, pumps, heaters, thermocouples, pressure indicators, mixers, heat exchangers, and the like may not be shown.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method of processing a pyrolysis oil, the method comprising;
    processing a pyrolysis oil obtained from pyrolysis of a plastic in a catalytic cracking unit, a hydrocracking unit, and/or a thermal cracking unit under reaction conditions sufficient to produce a gaseous stream comprising propylene and a liquid stream with a boiling range of 35 to 400° C.; and
    processing the liquid stream to produce additional propylene,
wherein a portion of the pyrolysis oil or the entire pyrolysis oil is blended with vacuum residue to form a first pyrolysis oil blend, and the first pyrolysis oil blend is processed in the thermal cracking unit.

2. The method of claim 1, wherein the liquid stream includes a hydrocarbon stream having a boiling range of naphtha.

3. The method of claim 1, wherein the processing includes:
    hydrotreating the liquid stream in a hydrotreater to produce a hydrotreated liquid stream; and
    steam-cracking the hydrotreated liquid stream in a steam cracker to produce additional propylene.

4. The method of claim 3, further comprising: prior to the steam cracking step, processing the hydrotreated liquid stream in an aromatics extraction unit to remove aromatics.

5. The method of claim 3, wherein the steam-cracking step further produces ethylene, benzene, toluene, and xylene.

6. The method of claim 5, wherein the benzene and at least some propylene are used to produce cumene and the cumene is used to produce polycarbonate, and wherein the benzene and at least some ethylene are used to produce ethylbenzene and the ethylbenzene is subsequently dehydrogenated to produce styrene.

7. The method of claim 6, wherein the styrene is used to produce polystyrene, acrylonitrile butadiene styrene (ABS), acrylonitrile resin (SAN), or styrene-butadiene rubber (SBR).

8. The method of claim 1, wherein the plastic includes polyolefins, polyethylene terephthalate (PET), polyamide (PA) and polyvinyl chloride (PVC), polystyrene (PS), polycarbonate (PC) and acrylonitrile/butadiene styrene co-polymer (ABS), or combinations thereof.

9. The method of claim 1, wherein a portion of the pyrolysis oil is mixed with vacuum gasoil to form a second pyrolysis oil blend, and the second pyrolysis oil blend is processed in the catalytic cracking unit.

10. The method of claim 1, where propylene is used as a feedstock for producing polypropylene.

11. The method of claim 1, wherein the catalytic cracking unit includes a fluid catalytic cracker, and the fluid catalytic cracker is operated at a reaction temperature of 450 to 750° C. and a reaction pressure of 1 to 6 bara.

12. The method of claim 1, wherein the thermal cracking unit includes visbreaker and/or a delayed coker, or a deep thermal cracking unit with additional cracking stage, and the thermal cracking unit is operated at a reaction temperature of 350 to 900° C. and a reaction pressure of 1 to 6 bara.

13. The method of claim 3, wherein the hydrotreater is operated at a temperature of 150 to 450° C. and a reaction pressure of 20 to 120 barg, and a hydrogen partial pressure of 15 to 100 barg.

14. A method of processing a plastic, the method comprising:
- forming a pyrolysis oil from a plastic and blending the pyrolysis oil with vacuum residue to form a pyrolysis oil blend;
- thermal-cracking, in a thermal cracking unit, the pyrolysis oil blend to produce a gaseous stream comprising propylene and a liquid stream having a boiling range of 35 to 400° C.; and
- processing the liquid stream to produce additional propylene.

15. The method of claim 14, wherein the thermal-cracking step further produces thermal-crack gasoil and a thermal-crack light gas stream comprising thermal-cracked light gases.

16. The method of claim 15, further comprising:
- hydrotreating, in a hydrotreatment unit, the thermal-crack gasoil to produce hydrotreated gasoil to produce hydrotreated gasoil;
- catalytic-cracking the hydrotreated gasoil to produce a second liquid stream comprising naphtha having a boiling range of 35 to 400° C., and catalytic cracking light gases.

17. The method of claim 16, wherein the vacuum residue is from crude oil and wherein the method further comprises feeding a vacuum gasoil in the hydrotreatment unit.

18. The method of claim 16, wherein the liquid stream and the second liquid stream are further processed to produce benzene and light olefins.

19. The method of claim 16, wherein the catalytic cracking light gases and the thermal cracked light gases are further processed to produce ethylene and propylene.

* * * * *